US012510236B2

(12) United States Patent
Bukkems et al.

(10) Patent No.: US 12,510,236 B2
(45) Date of Patent: Dec. 30, 2025

(54) LIGHTING DEVICE WITH ADJUSTABLE SUSPENSIBLE SUPPORT

(71) Applicant: SIGNIFY HOLDING B.V., Eindhoven (NL)

(72) Inventors: Peter Johannes Martinus Bukkems, Deurne (NL); Elena Tiziana Ferrari, Brabant (NL); Bianca Maria Irma Van Der Zande, Heeze (NL); Simone Helena Maria Poort, Veldhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/724,214

(22) PCT Filed: Dec. 12, 2022

(86) PCT No.: PCT/EP2022/085385
§ 371 (c)(1),
(2) Date: Jun. 26, 2024

(87) PCT Pub. No.: WO2023/131473
PCT Pub. Date: Jul. 13, 2023

(65) Prior Publication Data

US 2025/0060089 A1 Feb. 20, 2025

(30) Foreign Application Priority Data

Jan. 4, 2022 (EP) .................................... 22150116

(51) Int. Cl.
*F21V 21/30* (2006.01)
*F21S 8/06* (2006.01)
(Continued)

(52) U.S. Cl.
CPC .............. *F21V 21/30* (2013.01); *F21S 8/061* (2013.01); *F21V 15/01* (2013.01); *F21V 21/112* (2013.01);
(Continued)

(58) Field of Classification Search
CPC ...... F21V 21/008; F21V 21/112; F21V 21/16; F21V 21/30; F21V 21/10; F21S 8/061; F21S 8/06; F21S 8/068
See application file for complete search history.

(56) References Cited

U.S. PATENT DOCUMENTS 4,446,626 A * 5/1984 Grender ................. G01C 15/02
33/286
6,517,222 B1 * 2/2003 Orlov .................... F21V 21/112
362/147

(Continued)

FOREIGN PATENT DOCUMENTS

DE 202005015148 U1 2/2006
DE 202005020944 U1 12/2006

(Continued)

*Primary Examiner* — Ismael Negron

(57) ABSTRACT

A lighting device includes a housing having an attachment surface with an outer portion facing the ambient, and an inner portion opposite the outer portion; an attachment provided in a fixed location on the attachment surface; and a balancing element arranged adjacent to the attachment
(Continued)

surface and movable between at least a first position and a second position with respect to the fixed location of the attachment element.

15 Claims, 4 Drawing Sheets

(51) Int. Cl.

| | |
|---|---|
| ***F21V 15/01*** | (2006.01) |
| ***F21V 21/112*** | (2006.01) |
| ***F21V 29/503*** | (2015.01) |
| ***F21V 29/70*** | (2015.01) |
| ***F21V 29/89*** | (2015.01) |
| *F21V 21/15* | (2006.01) |
| *F21Y 113/00* | (2016.01) |
| *F21Y 115/10* | (2016.01) |

(52) U.S. Cl.

CPC ............ *F21V 29/503* (2015.01); *F21V 29/70* (2015.01); *F21V 29/89* (2015.01); *F21V 21/15* (2013.01); *F21Y 2113/30* (2023.05); *F21Y 2115/10* (2016.08)

(56) References Cited

U.S. PATENT DOCUMENTS

| | | | | |
|---|---|---|---|---|
| 11,365,873 | B2 * | 6/2022 | Tuulos | F21V 21/112 |
| 11,512,842 | B2 * | 11/2022 | Tiessen | F21V 21/16 |
| 2005/0051673 | A1 * | 3/2005 | Radin | F21V 21/112 248/58 |
| 2007/0147050 | A1 * | 6/2007 | Lecluze | F21V 21/16 362/362 |
| 2020/0284412 | A1 | 9/2020 | Deakins | |
| 2020/0378587 | A1 | 12/2020 | Tuulos | |

FOREIGN PATENT DOCUMENTS

| | | | | |
|---|---|---|---|---|
| DE | 102008017462 | B3 * | 11/2009 | F21V 21/112 |
| DE | 202018102694 | U1 | 8/2019 | |
| EP | 2118560 | B1 | 5/2013 | |
| JP | 2000195301 | A | 7/2000 | |
| WO | 2020234433 | A1 | 11/2020 | |

* cited by examiner

LIGHTING DEVICE WITH ADJUSTABLE SUSPENSIBLE SUPPORT

CROSS-REFERENCE TO PRIOR APPLICATIONS

This application is the U.S. National Phase application under 35 U.S.C. § 371 of International Application No. PCT/EP2022/085385, filed on Dec. 12, 2022, which claims the benefit of European Patent Application No. 22150116.6, filed on Jan. 4, 2022. These applications are hereby incorporated by reference herein.

FIELD OF THE INVENTION

The invention relates to a suspensible device comprising a balancing element, and a method for adjusting the suspension angle (a) of such a suspensible device.

BACKGROUND OF THE INVENTION

Today, people are well aware of the environmental changes due to human activities, causing extreme weather conditions and natural disasters. To remedy this situation, it is important to contribute to sustainability and circularity actions in order to maintain our beautiful planet and human health.

In public environments, various devices may be used in order to create a pleasant and functional atmosphere. For instance, spotlights are used to set a correct lighting in the department store, an office, a waiting room, or the like. Microphones or loudspeakers may be arranged to provide an information channel to the subjects residing the public environment or to monitor the noise level. Further, disinfecting devices such as UV emitters or ionizers may be arranged in order to improve air quality and prevent spread of pathogens, which is particularly important in hospitals and other health care facilities.

Since public environments are subjected to a large number of visitors, such spaces need frequent refurbishments in order to keep aesthetically appealing appearance. Normally, a public environment needs to be refurbished every 10th year. Therefore, devices arranged in such spaces are normally replaced after a time period being sufficiently shorter than the lifetime of the device. It would thus be beneficial to recycle such devices and adapt them to another application area, such as a private environment, i.e. a house or an apartment.

The devices mentioned above are normally mounted to a ceiling using a rather stiff construction to be able to adjust the device in the right direction. When it is desired to arrange the device at a distance from the ceiling, at least one robust arm is required. The arms are bulky, which might hamper the aesthetical design requirements of the customer or limit the usage to only dedicated applications and are therefore not always appreciated in a private environment.

Therefore, there is a need to provide a device having a structure that enables improved recycling, such that the device is easily adaptable to a required application area.

WO2020234433A1 discloses a lighting apparatus comprising an adjustment device for changing the cable support point on the lighting apparatus.

SUMMARY OF THE INVENTION

In view of the above, the object of the present invention is to overcome the problems of the prior art. To this end, the present invention provides a suspensible device comprising a housing comprising an attachment surface and at least one active surface.

By the term "suspensible" is in the context of the present invention understood as capable of being suspended, i.e. to hang so as to be free on all sides except at the point of support. In other words, the suspensible device may be arranged on a support rail or a support arm or may be suspended from the ceiling or another surface, as will be described in greater detail below.

The device according to the present invention thus offers an advantage of being highly adaptable, such that the device may be arranged in a public environment using robust and complex mounting structures, and may subsequently be recycled upon refurbishment of the public environment, such that it is used in a private environment as a suspended device. As mentioned above, it is advantageous to be able to suspend a recycled device in a private environment, such that the user may integrate the device in the design of his or her home. Indeed, a suspensible device according to the present invention may be a brand new device.

Another advantage of the device according to the present invention is the supplier of such a device gives peace of mind to the user running the public environment, such as a shop, a restaurant, an art gallery or the like, since the supplier may provide a recycling service, taking back the device whenever the need for complete refurbishment of the public environment. Such a service enables the user running the public environment to keep up with the pace of the fast-changing dynamics of the market, while contributing to a better world. On the other hand, a user of a private environment obtains a recycled device having an excellent lifetime and light quality (CRI>90; wide bundle) features along with an attractive price tag, while contributing to a better world. Finally, the supplier of the device of the present invention increases environmental awareness and engagement of the users, while increasing circularity revenues due to the low bill of materials (BoM) and high margins.

The term "device" in the context of the present invention may refer to a light-emitting device, such as a spotlight. Alternatively, the term device may refer to a loudspeaker, a microphone, a disinfecting device, such as an emitter of disinfecting light and/or microwave irradiation, or an ionizer.

Depending on the intended application, the suspensible device may comprise at least one light source, such as a light emitting diode (LED) light source arranged to emit visible light having a dominant peak in a wavelength range of 400 to 800 nm. In such an embodiment, the at least one light source may be in thermal contact with the balancing element, such that the heat emitted by the at least one light source is dissipated through the balancing element. It is further conceivable that the light source is in electrical contact with the balancing element, i.e. the balancing element may be a driver or a compact driver. Alternatively, or additionally, the suspensible device according to the present invention may comprise a light source arranged to emit UV light having a dominant peak in a wavelength range from 190 to 400 nm. Further, the device may comprise a source emitting IR radiation having a dominant peak in the wavelength range from 760 to 2500 nm. The device of the present invention may also comprise at least one sensor.

The housing of the device of the present invention may be of any suitable shape and size. In particular, the housing may be cylindric, cuboid, hexagon, semispherical, spherical, or organic shapes, i.e. shapes, often being curvilinear in appearance, that are similar to those found in nature, such as plants, animals, and rocks.

The housing may be substantially cylindric and may comprise a lateral surface, a first base surface and a second base surface, and wherein the first base surface constitutes the active surface, and the second base surface constitutes the attachment surface. Alternatively, the housing may be substantially cuboid, wherein a first face of the cuboid constitutes the active surface, and a second face of the cuboid being substantially parallel to the first face constitutes the attachment surface.

Preferably, the housing is light-weight. To this end, the housing may be manufactured of a material having relatively low density, such as a polymeric material, particularly polycarbonate (PC), acrylonitrile butadiene styrene (ABS), polycarbonate/acrylonitrile butadiene styrene (PCABS), polyethylene terephthalate (PET) or polypropylene (PP) and mixtures thereof. By the term "low density" is meant a density of below 1.5 g/cm$^3$, preferably below 0.9 g/cm$^3$. Further, the housing of the device according to the present invention may be manufactured of paper, textile, or mixture thereof. In a particularly preferred embodiment, the housing is manufactured of a natural and/or recycled material. Further, a gas assist moulding material or foam material to reduce the weight of the housing even further. Thus, gas assist moulding could reduce the weight/density by approximately 20% by gas filling, while chemical foams allow up to 90% weight/density reduction.

By the term "attachment surface" is meant a surface arranged to be connected to a suspension element when the device is suspended, as will be described in greater detail below. It should be noted that the attachment surface is not necessarily the surface to which the mounting arrangement is attached when the device is used in another application before it is used as a suspensible device. The attachment surface comprises an outer portion facing the ambient and an inner portion arranged opposite to the outer portion, i.e. facing inside the housing.

The active surface of the device according to the present invention is the surface through which electromagnetic radiation is emitted or received. Depending on the function of the device, the electromagnetic radiation may be radio waves, microwaves, infrared light, visible light, ultraviolet light, and combinations thereof. The active surface may vary in shape and size depending on the shape and size of the housing as well as the chosen design of the device. Preferably, the attachment surface and the active surface are two different surfaces of the housing. In particular, the attachment surface may be arranged opposite to the active surface. However, it is conceivable that the attachment surface and the active surface is the same surface.

The suspensible device of the present invention further comprises a balancing element arranged adjacent to the attachment surface. The term "adjacent" implies that the balancing element is arranged in direct contact with the attachment surface, or at a negligible distance from the attachment surface. It is further conceivable that an additional layer of material is arranged between the balancing element and the attachment surface. The balancing element may be arranged adjacent to the outer portion of the attachment surface. Alternatively, the balancing element may be arranged adjacent to the inner portion of the attachment surface, such that the balancing element is not visible. The balancing element is movable between a first position and at least a second position. The balancing element may be movable between a first position and a plurality of second positions. By term "plurality" is meant at least two.

It should be noted that the balancing element may be retrofitted into the suspensible device. Such an embodiment is advantageous since virtually any device may be used as a suspensible device according to the present invention by arranging the balancing element as disclosed above.

The balancing element according to the present invention further comprises an actuating element arranged for moving the balancing element between the first position and the second position. The actuating element may be in the form of a lever, or a button arranged to be manually maneuvered by the user. The actuating element may further be in the form of a motor arranged to be remotely operated. Such an operation of the actuating element may be performed by the user, e.g. by means of an app, or may be performed automatically. The actuating element may further be arranged for rotating the balancing element around an axis being perpendicular to the attachment surface of the suspensible device.

The balancing element may be a substantially flat element comprising an aperture. By the term "flat" is meant having an extension in a first plane being significantly a factor greater than an extension in a second plane being perpendicular to the first plane, for example greater by at least a factor two, at least a factor three, or at least a factor five, such as a factor six. The aperture may be arranged in a central portion of the balancing element, or in a peripheral portion of the balancing element. In particular, the balancing element may be an annular element having a non-constant width and/or thickness. Further, it is conceivable to provide a plurality of the balancing elements in order to obtain a more pronounced effect. In particular, the balancing elements may be rotatable in relation to each other.

The balancing element may be manufactured of metals or heavy metals, e.g. brass, lead, zamac, steel or the like. The balancing element may comprise a mixture of at least two materials. Using a material having relatively high density provides the advantage of enhancing the effect of the balancing element, as will be described in greater detail below. By the term "high density" is understood a density of at least 2 g/cm$^3$, preferably at least 5 g/cm$^3$, more preferably at least 7 g/cm$^3$, most preferably at least 13 g/cm$^3$.

The balancing element may be manufactured of a material having thermal conductivity of at least 100 W/m·K. In such an embodiment, the balancing element functions as a heat sink, thus eliminating the need for an additional heat sink element.

The suspensible device of the present invention normally comprises at least one driver component, such as a high-power transistor, a stepper motor, or the like. In such an embodiment, the at least one driver component may be used as a balancing element.

When the suspensible device is a light-emitting device having a light exit window, as will be described in greater detail below, it may further comprise a flat optical element arranged adjacent to the light exit window.

The present invention further relates to a device system comprising a suspensible device as described above. The device system further comprises a suspension element comprising a first end portion being attached in a fixed location at/in/on the housing to the attachment element or cable support point of the attachment surface of the housing and a second end portion being attachable to a fastening surface. The fastening surface is to be understood as a surface from which the suspensible element is intended to be suspended, e.g. a ceiling, a shelf, or the like. Once the suspensible device is attached to the suspension element, it is referred to as "suspended device". In a fixed location means that the position at which the suspension element is attached to the attachment surface cannot be changed, and that the position of the suspension element is fixed with respect to suspended device. The balancing element though is movable and repositionable with respect to the suspension element and the rest of the suspended device, thus enabling to change the location of the center of gravity of the suspended device with respect to (fixed) position at which the suspension element is attached to the attachment element of the attachment surface. When the suspensible device is attached to the suspension element, a suspension angle is defined between the attachment surface of the suspensible device and the suspension element. The suspension angle has a first value when the balancing element is in the first position, and a second value when the balancing element is in the second position. In other words, the value of the suspension angle changes when the balancing element is moved from a first position to a second position because of a shift of the center of gravity, due to the relocation of the balancing element, of the suspension device with respect to the attachment location of the suspension element to the attachment element on the attachment surface. It is thus possible to change the position of the center of gravity of the suspensible device with respect to the attachment element without changing the position of the attachment element. The device system of the present invention thus offers the advantage of providing an attractive alternative for a suspended device that may be directed in different directions by moving the balancing element between the first position and at least one second position, yet without the visible, unattractive relocation of the suspension element on the suspended device. The suspended device may be directed in different directions by tilting and/or rotating the suspended device.

The suspended device is mechanically connected to the first end portion of the suspension element. Mechanical connection implies a direct contact between the suspended device and the suspension element. Mechanical connection may be provided by means of at least one fastening element, such a clip, a magnet, a hook, a Velcro, or the like.

The suspension element may be a wire having diameter being below 1 cm, preferably below 0.75 cm, more preferably below 0.5 cm. In other words, the suspension element may be a thin wire, thus providing the advantage of being virtually invisible to the user. The length of the suspension element may vary depending on the intended application. In particular, the length of the suspension element may be from 20 cm to 30 m, preferably from 40 cm to 20 m, more preferably from 50 cm to 10 m.

The suspended device may be electrically connected to the suspension element. Electrical connection may be provided by means of an electrical connection element, such as plug-and-socket, a pin contact, or a USB port. Alternatively, electrical connection may be achieved wirelessly, e.g. through induction. If the suspensible device is only mechanically connected to the suspension element, the electrical power supply to the suspensible device may be provided by an external power supply source, such as a disposable or rechargeable battery. In such an embodiment, the battery may be used as the balancing element. Preferably, the suspensible device is both mechanically and electrically connected to the suspension element.

The first value of the suspension angle may be substantially 90°, i.e. the suspended device is arranged such that the attachment surface is pointing upwards, and preferably such that the active surface is pointing downwards. The term "downwards" implies the direction being parallel to the direction of gravitational acceleration, and the term "upwards" is the direction being opposite to the direction of gravitational acceleration.

The second value of the suspension angle may be from 5° to 80°, preferably from 10° to 50°. In other words, when the balancing element has been moved from the first to the second position, the suspended device is tilted from the position where the attachment surface is pointing upwards to the position where the attachment surface is pointing in a direction inclined in relation to the upward direction.

According to a particular embodiment, the suspended device may be a cylindric light-emitting device comprising a lateral surface, a first base surface constituting a light exit window, and a second base surface constituting the attachment surface. When the balancing element is in a first position, the light-emitting device may be arranged such that the light exit window is pointing downwards. Such an arrangement of the light-emitting device may be desirable when the light-emitting device is arranged over a table, and when the user needs the table to be sufficiently illuminated, e.g. when having a meal. At a later occasion, e.g. once the meal is finished, the user might want to redirect the light-emitting device such that another point in the room, e.g. a painting, is illuminated instead. In order to achieve this, the user simply activates the actuating element such that the balancing element is moved from the first to the second position, thus tilting and/or rotating the suspended light-emitting device, such that the light exit window is pointing towards a wall or the like. This effect is enhanced when the housing is light-weight, as described above.

As evident from the above, the present invention provides a device system, wherein the suspensible device has a neat design which fits into most of the environments, and that is easily redirectable by activating the actuating element.

Finally, the present invention relates to a method for adjusting the suspension angle of a suspensible device of a device system as described above, the method comprising the steps of:

a) suspending the suspensible device by attaching the first end portion of the suspension element to the attachment surface of the suspensible device, and by attaching the second end portion of the suspension element to the fastening surface such that the balancing element is in the first position and the suspension angle has a first value;
b) moving the balancing element from the first position to a second position such that the suspension angle has a second value.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

Figure 2:
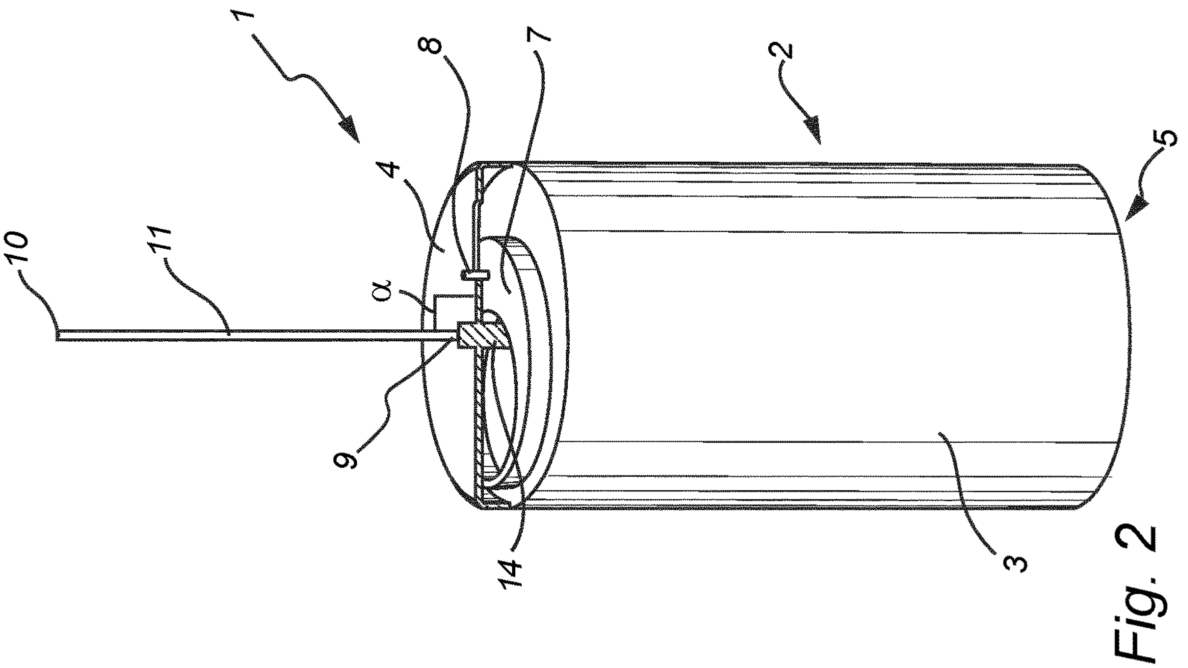
FIG. 2 shows a perspective view of the device system depicted in FIG. 1, wherein the suspension angle $\alpha = 90°$.

All the figures are schematic, not necessarily to scale, and generally only show parts which are necessary in order to elucidate embodiments of the present invention, wherein other parts may be omitted or merely suggested.

DETAILED DESCRIPTION OF THE INVENTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical or similar reference numerals denote the same or similar components having a same or similar function, unless specifically stated otherwise.

Figure 1:
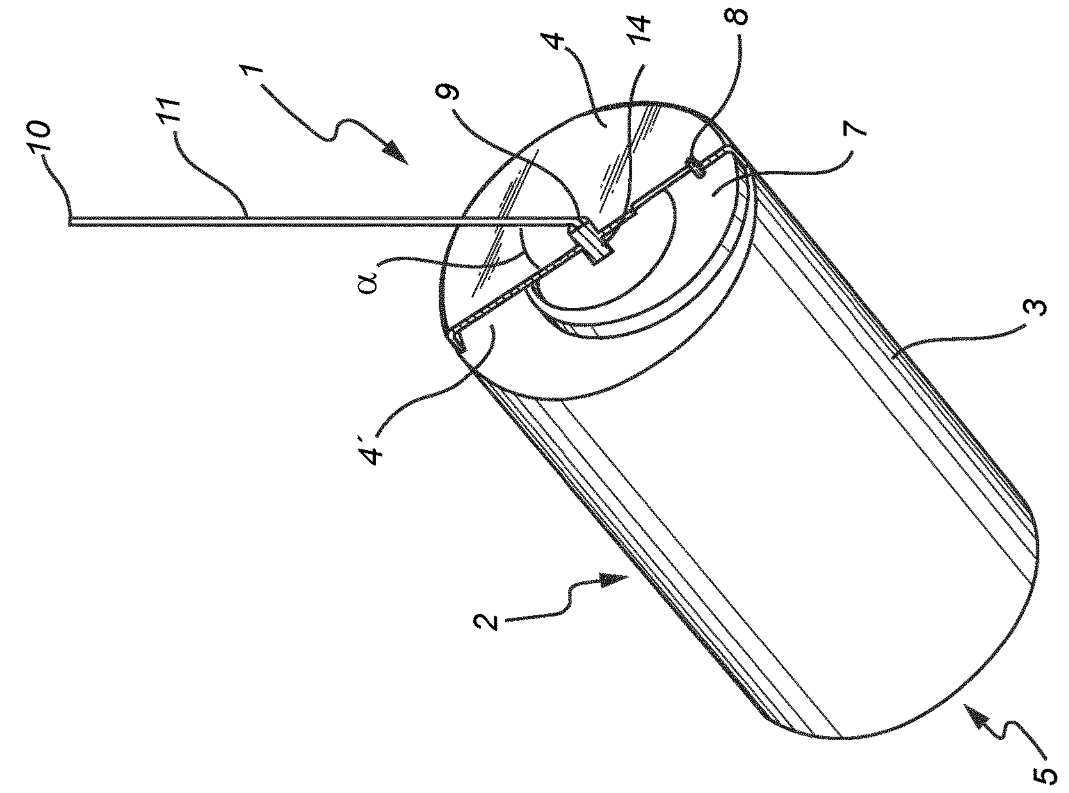
FIG. 1 shows a perspective view of the device system according to the present invention, wherein the suspension angle $\alpha \neq 90°$.

FIG. 1 shows a device system 1 comprising a suspensible device 2. The suspensible device 2 comprises a housing 3 comprising an active surface 5 and an attachment element 14 provided on an attachment surface 4. The attachment surface 4 is arranged opposite to the active surface 5. The suspensible device 2 depicted in FIG. 1 is a light-emitting device comprising at least one light source 6, as may be seen in FIGS. 4*a* and 4*b*. Further, the active surface 5 of the suspensible device 2 is a light-exit window.

The housing 3 depicted in FIG. 1 is substantially cylindric and comprise a lateral surface 3', a first base surface and a second base surface, and wherein the first base surface constitutes the active surface 5, and the second base surface constitutes the attachment surface 4. As mentioned above, the housing is preferably light-weight.

Figure 3:
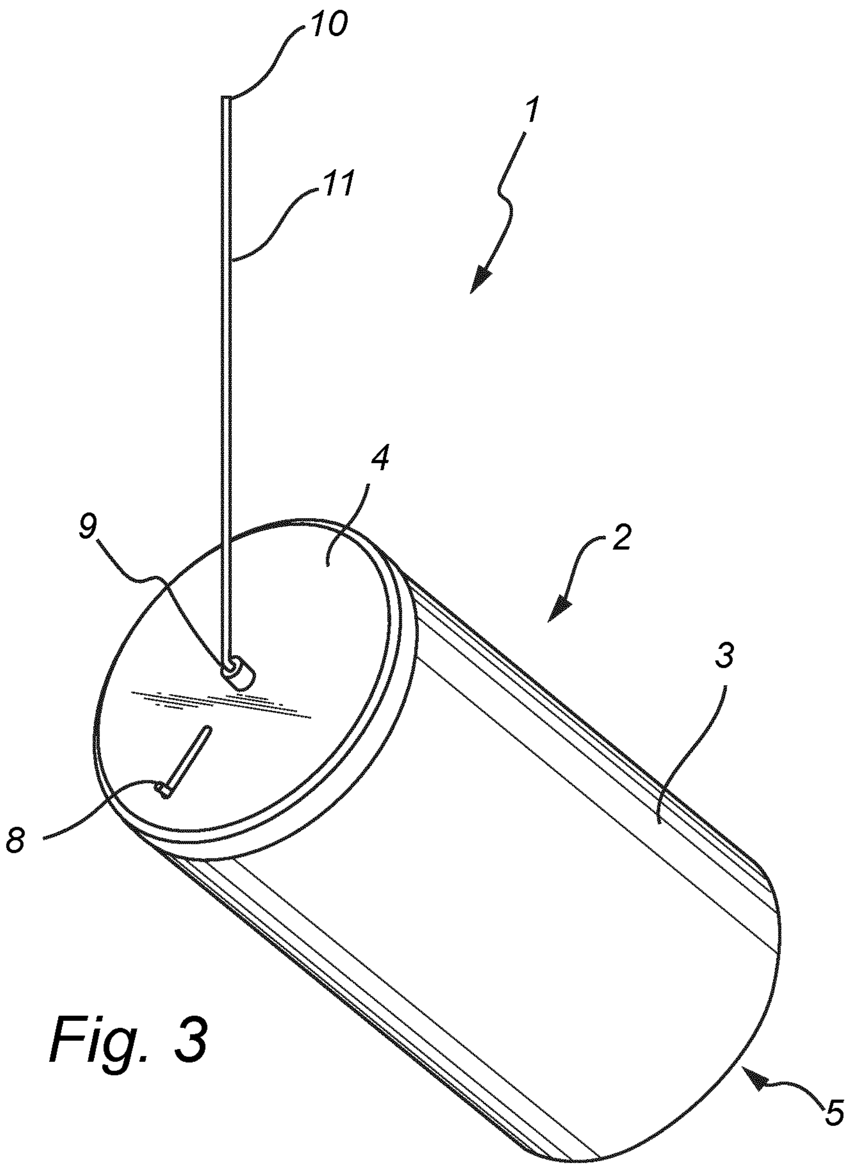
FIG. 3 illustrates another perspective view of the device system of the present invention.

The suspensible device 2 further comprises a balancing element 7 arranged adjacent to the inner portion 4' of the attachment surface 4, such that the balancing element 7 is not visible, as may be seen in FIG. 3. As shown, the balancing element 7 is movable between a first position shown in FIG. 1, and a second position shown in FIG. 2 with respect to the suspension element 11 and the rest of the suspended device 2. Yet, the first end portion 9 of the suspension element 11 stays attached to the attachment element 14 (also mentioned cable support point 14) on the attachment surface 4 in a fixed position at/in/on the housing 3 both on the attachment surface 4 and with respect to the rest of the suspensible device 2 (except for the balancing element 7).

The balancing element 7 according to the present invention further comprises an actuating element 8 arranged for moving the balancing element 7 between the first position and the second position. The actuating element 8 depicted in FIGS. 1 and 2 is in the form of a lever arranged to be manually maneuvered by the user.

The balancing element 7 is an annular element having an aperture arranged in a peripheral portion of the balancing element 7.

Figure 4B:
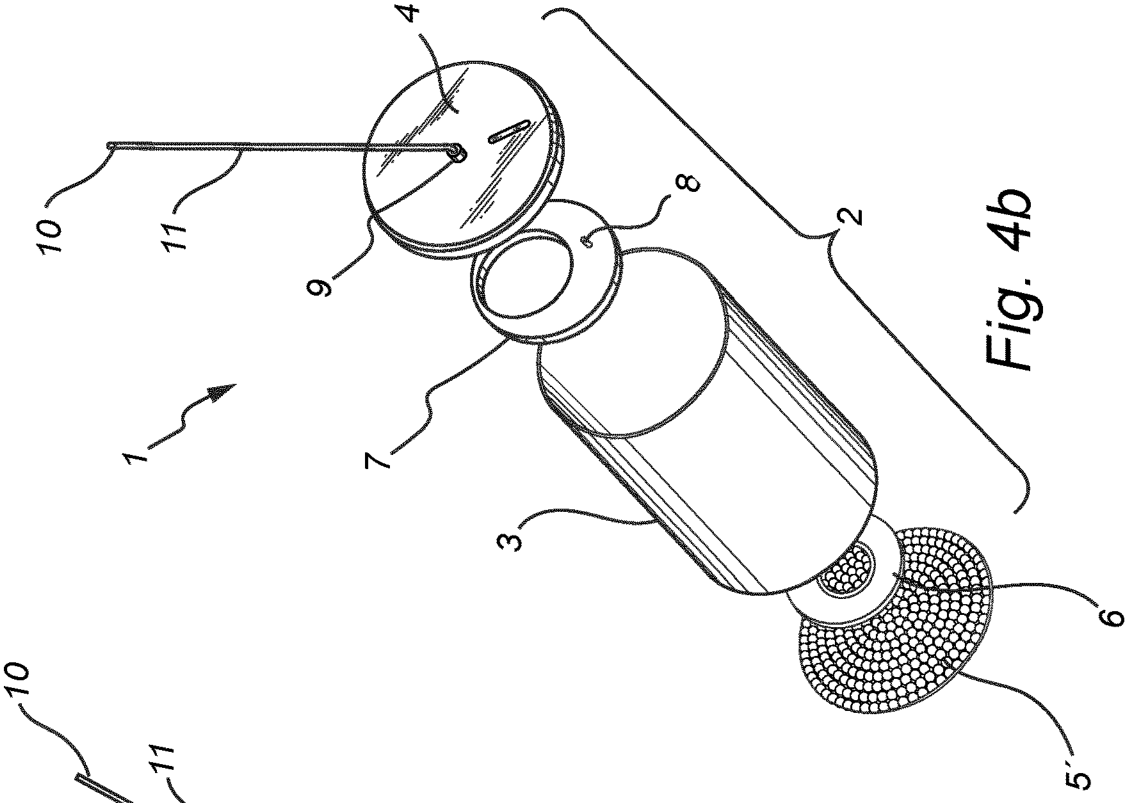
FIGS. 4*a* and 4*b* depict an exploded view of the device system of the present invention, wherein the suspended device is a light-emitting device.
Figure 4A:
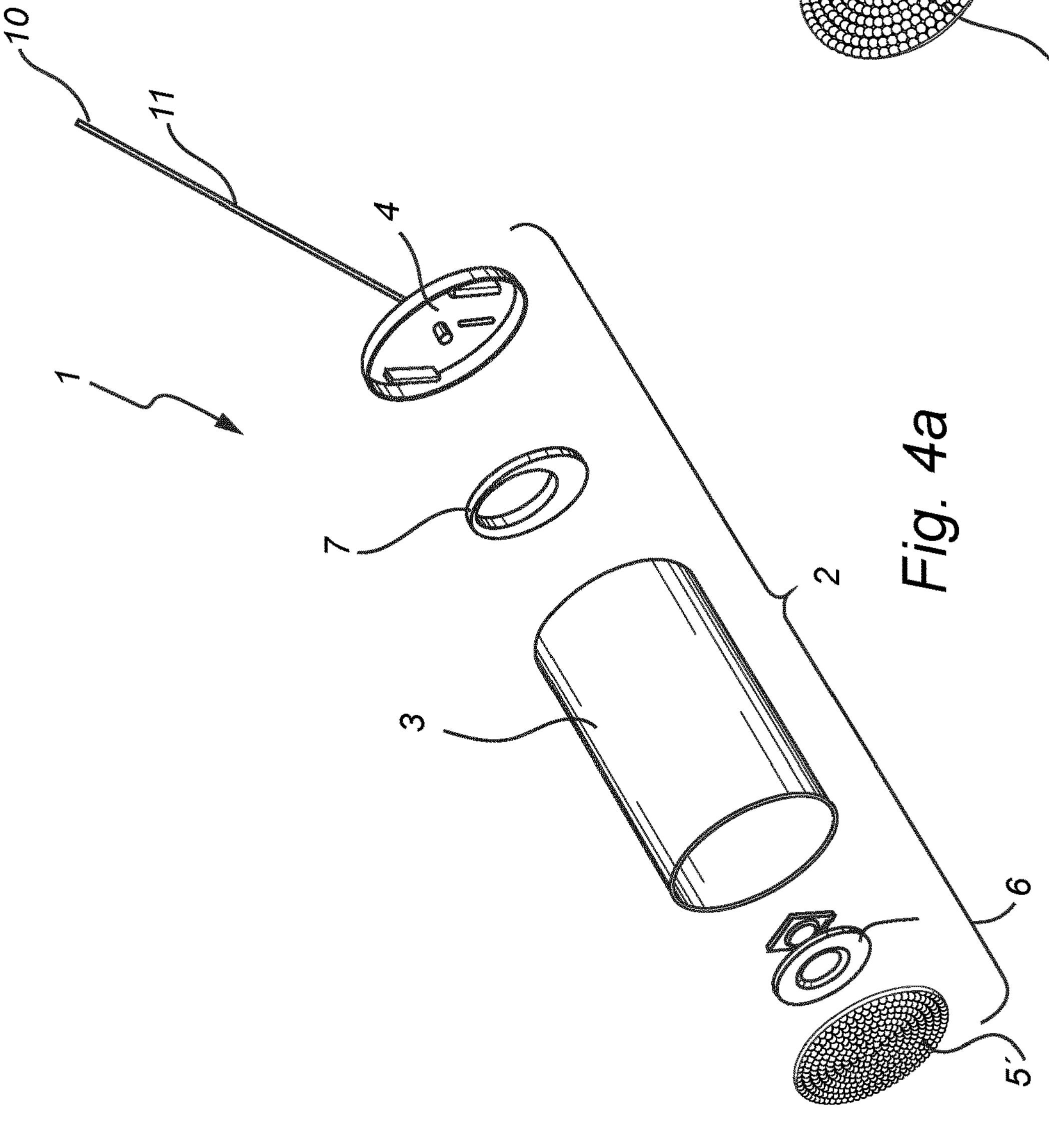

The suspensible device 2 further comprise a flat optical element 5' arranged adjacent to the light exit window 5, as may be seen in FIGS. 4*a* and 4*b*.

The device system 1 further comprises a suspension element 11 comprising a first end portion 9 being attached to the attachment surface 5 of the housing 3, and a second end portion 10 being attachable to a fastening surface (not shown). When the suspensible device 2 is attached to the suspension element 11, a suspension angle α is defined between the attachment surface 4 of the suspensible device 2 and the suspension element 11. The suspension angle α has a first value when the balancing element 7 is in the first position, as shown in FIG. 1, and a second value when the balancing element 7 is in the second position depicted in FIG. 2. In other words, the value of the suspension angle α changes when the balancing element 7 is moved from a first position to a second position. The device system 1 of the present invention thus offers the advantage of providing a suspended device 2 that may be directed in different directions by moving the balancing element 7 between the first position and at least one second position. The suspended device 2 may be directed in different directions by tilting and/or rotating the suspended device 2.

The suspended device 2 is mechanically connected to the first end portion 9 of the suspension element 11. Mechanical connection implies a direct contact between the suspended device 2 and the suspension element 11. Further, the suspended device 2 is electrically connected to the suspension element 11.

As depicted in FIG. 1, the first value of the suspension angle α is approximately 30°, i.e. the suspended device 2 is arranged such that the suspended device 2 is tilted from the position where the attachment surface 4 is pointing upwards to the position where the attachment surface 4 is pointing in a direction inclined in relation to the upward direction. In other words, the suspended device 2 shown in FIG. 1 functions as a spotlight.

As shown in FIG. 2, the second value of the suspension angle α is 90°. In other words, when the balancing element 7 has been moved from the first to the second position, the suspensible device 2 is moved to a position wherein the attachment surface 4 is pointing upwards, i.e. wherein the light emitted by the light source 6 is directed downwards.

FIG. 3 provides a detailed view of the actuating element 8, which is activated by the user when it is desired to tilt the suspended device 2.

Figure 5A:
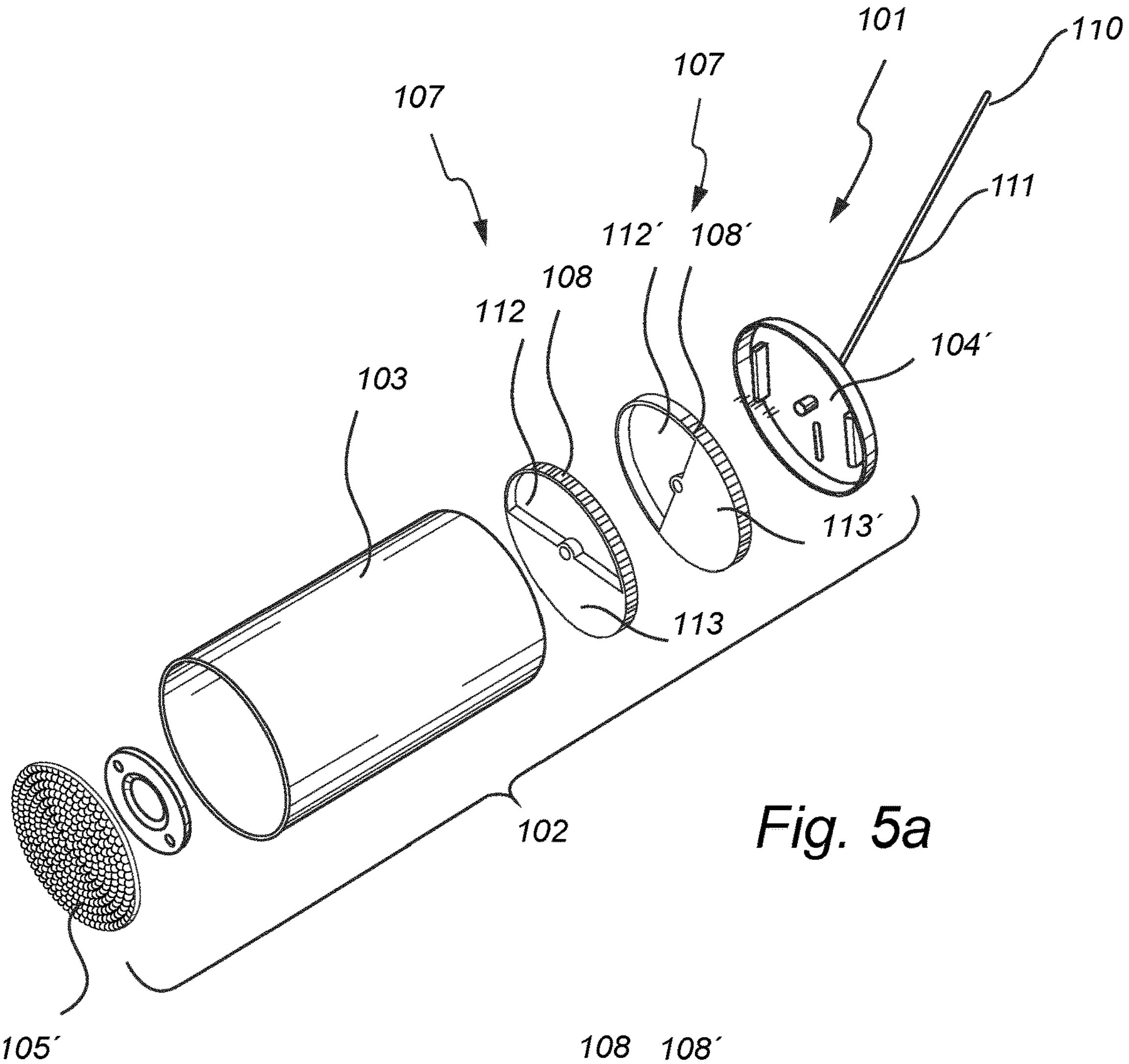
FIGS. 5*a* and 5*b* depicts an exploded and assembled view, respectively, of the device system according to another embodiment of the invention.
Figure 5B:
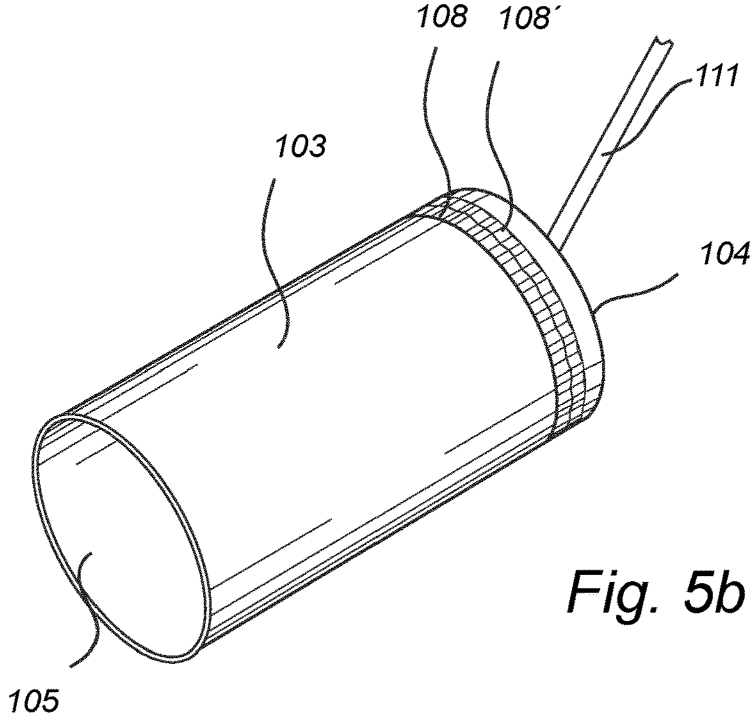

FIGS. 5*a* and 5*b* show a device system 101 comprising a suspensible device 102. The suspensible device 102 comprises a housing 103 comprising an attachment surface 104 and an active surface 105.

The suspensible device 102 further comprises two balancing element 107, 107' arranged adjacent to the inner portion 104' of the attachment surface 104. The balancing elements 107, 107' are movable between a first position and a plurality of second positions.

Each of the balancing elements 107, 107' comprises an aperture 112, 112', a solid portion 113, 113', and an actuating element 108, 108' arranged for moving the balancing element 107, 107' between the first position and the second position. The actuating element 108, 108' depicted in FIGS. 5*a* and 5*b* is in the form of a ribbed edge portion arranged to be manually maneuvered by the user.

The suspensible device 102 further comprise a flat optical element 105' arranged adjacent to the light exit window 105.

In analogy with the above, when the suspensible device 102 is attached to the suspension element 111, a suspension angle α is defined between the attachment surface 104 of the suspensible device 102 and the suspension element 111. The suspension angle α has a first value when the balancing elements 107, 107' are in the first position, and a second value when the balancing elements 107, 107' are in the second position. In other words, the value of the suspension angle α changes when the balancing elements 107, 107' are moved from a first position to a second position. The device system 101 of the present invention thus offers the advantage of providing a suspended device 102 that may be directed in different directions by moving the balancing elements 107, 107' between the first position and at least one second position.

The first position of the balancing elements 107, 107' may be defined as the position where the aperture 112 of the first balancing element 107 is aligned with the solid portion 113' of the second balancing element, and the solid portion 113 of the first balancing element 107 is aligned with the aperture 112' of the second balancing element 107'. In such a position, the weight provided by the balancing elements 107, 107' is evenly distributed, thus causing the suspensible device 102 to point downwards such that the suspension angle α is 90°. The second position of the balancing elements 107, 107' may be defined as the position where the aperture 112 of the first balancing element 107 is aligned with the aperture 112' of the second balancing element, and the solid portion 113 of the first balancing element 107 is aligned with the solid portion 113' of the second balancing element 107'. In such a position, the weight provided by the balancing elements 107, 107' is shifted, thus causing the suspensible device 102 to tilt such that the suspension angle α is below 90°. When the user wishes to change the suspension angle α, he simply activates one or both of the actuating elements 108, 108' and rotates one or both of the balancing elements 107, 107' until a desired suspension angle α is obtained.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A suspensible device comprising:

a housing with at least one active surface, and an attachment surface having an outer portion facing an outside of the housing and an inner portion arranged opposite the outer portion;

an attachment element provided in a fixed location on the attachment surface; and a balancing element arranged adjacent to said attachment surface, said balancing element being movable between a first position and at least a second position with respect to the fixed location of the attachment element of the suspensible device, wherein said balancing element is arranged adjacent to said inner portion of said attachment surface, and wherein said balancing element is an annular element having at least one of a non-constant width or thickness.

2. The suspensible device according to claim 1, wherein said balancing element further comprises an actuating element arranged for moving said balancing element between said first position and said second position.

3. The suspensible device according to claim 1, the balancing element comprising a plurality of balancing elements rotatable in relation to each other, wherein said balancing elements are arranged adjacent to said inner surface of said attachment surface.

4. The suspensible device according to claim 1, wherein said balancing element is a substantially flat element comprising an aperture.

5. The suspensible device according to claim 1, wherein said housing is substantially cylindrically shaped, and having a lateral surface, a first base surface, and a second base surface, wherein said first base surface constitutes said active surface, and said second base surface constitutes said attachment surface.

6. The suspensible device according to claim 1 wherein said housing is substantially cuboid and wherein a first face of said cuboid constitutes an active surface, and a second face of said cuboid being substantially parallel to said first face constitutes said attachment surface.

7. The suspensible device according to claim 1, wherein said housing is made of a polymeric material.

8. The suspensible device according to claim 1, wherein said balancing element is manufactured of steel.

9. The suspensible device according to claim 1, wherein said balancing element is made of a material having thermal conductivity of at least 100 W/m·K.

10. The suspensible device according to claim 1, wherein said suspensible device further comprises at least one diode (LED) light source arranged to emit at least one of visible light having a dominant peak in a wavelength range of 400 to 800 nm or UV light having a dominant peak in a wavelength range from 190 to 400 nm.

11. A device system comprising a suspensible device according to claim 1, said system further comprising a suspension element comprising a first end portion being attached to said attachment element of said attachment surface of said housing and a second end portion being attachable to a fastening surface, wherein a suspension angle (α) is defined between said attachment surface and said suspension element; and wherein said suspension angle (α) has a first value when said balancing element is in said first position, and a second value when said balancing element is in said second position.

12. The device system according to claim 11, wherein said first value of said suspension angle is substantially 90° and said second value of said suspension angle is from 5° to 80°.

13. The device system according to claim 11, wherein said suspension element is a wire having diameter of up to 1 cm.

14. A method for adjusting the suspension angle of a suspensible device of a device system according to claim 12, said method comprising the steps of:

a) suspending said suspensible device by attaching said second end portion of said suspension element to said fastening surface of said suspensible device such that said balancing element is in said first position and said suspension angle has a first value;

b) moving said balancing element from said first position to a second position such that said suspension angle (α) has a second value.

15. A suspensible device comprising:

a housing with at least one active surface, and an attachment surface having an outer portion facing an outside of the housing and an inner portion arranged opposite the outer portion;

an attachment element provided in a fixed location on the attachment surface; and a balancing element arranged adjacent to said attachment surface, said balancing element being movable between a first position and at least a second position with respect to the fixed location of the attachment element of the suspensible device, wherein said balancing element is arranged adjacent to said inner portion of said attachment surface, wherein said attachment surface covers at least a portion of said balancing element.

* * * * *